(12) United States Patent
Jackson et al.

(10) Patent No.: US 9,989,370 B2
(45) Date of Patent: Jun. 5, 2018

(54) REAL-TIME MULTIMODAL TRAVEL ESTIMATION AND ROUTING SYSTEM

(71) Applicant: Betria Interactive LLC, Irvine, CA (US)

(72) Inventors: Duncan Charles Jackson, Irvine, CA (US); David Neil Dyrnaes, Irvine, CA (US); Boris Veksler, Irvine, CA (US)

(73) Assignee: Betria Interactive LLC, Irvine, CA (US)

( * ) Notice: Subject to any disclaimer, the term of this patent is extended or adjusted under 35 U.S.C. 154(b) by 0 days. days.

(21) Appl. No.: 15/392,582

(22) Filed: Dec. 28, 2016

(65) Prior Publication Data

US 2017/0268891 A1    Sep. 21, 2017

Related U.S. Application Data

(60) Provisional application No. 62/310,114, filed on Mar. 18, 2016.

(51) Int. Cl.
*G01C 21/34* (2006.01)
*G01C 21/36* (2006.01)

(52) U.S. Cl.
CPC ..... *G01C 21/3423* (2013.01); *G01C 21/3492* (2013.01); *G01C 21/3676* (2013.01); *G01C 21/3682* (2013.01)

(58) Field of Classification Search
CPC ............ G01C 21/3423; G01C 21/3492; G01C 21/3676; G01C 21/3682
USPC ........................................................ 701/465
See application file for complete search history.

(56) References Cited

U.S. PATENT DOCUMENTS

| | | | |
|---|---|---|---|
| 2003/0046701 A1* | 3/2003 | O'Donnell | H04N 7/173 725/76 |
| 2008/0132212 A1* | 6/2008 | Lemond | H04B 7/18506 455/414.1 |
| 2015/0371157 A1* | 12/2015 | Jaffe | G06Q 10/025 705/6 |

OTHER PUBLICATIONS

International Search Report and Written Opinion dated Mar. 10, 2017 issued in counterpart PCT application No. PCT/US16/068856.

\* cited by examiner

*Primary Examiner* — Yazan A Soofi
(74) *Attorney, Agent, or Firm* — White & Case LLP

(57) ABSTRACT

A real-time multimodal travel estimation and routing system having a first mode for air-based travel and a second mode for ground-based travel, and a method for estimating a time of arrival to a ground-based destination having a first mode for air-based travel and a second mode for ground-based travel is disclosed. The real-time multimodal travel estimation and routing system is configured to receive an input designating a ground-based destination, a request for an available ground-based travel option, and display an estimated time of arrival to the ground-based destination based on first data stored on-board the aircraft for the second mode and real-time flight information for the aircraft for the first mode. The system is further configured to receive an update of real-time information for the available ground-based travel option and update the first data stored on-board the aircraft.

24 Claims, 7 Drawing Sheets

REAL-TIME MULTIMODAL TRAVEL ESTIMATION AND ROUTING SYSTEM

CROSS-REFERENCE TO RELATED APPLICATIONS

This application claims the benefit to U.S. Provisional Patent Application No. 62/310,114 entitled "Real-Time Multimodal Travel Estimation and Routing System" by David Neil Dyrnaes et al. and filed Mar. 18, 2016.

FIELD OF THE INVENTION

This invention generally relates to real-time multimodal travel estimation and routing systems.

BACKGROUND OF THE INVENTION

Today, passengers travelling in most modern commercial aircraft are able to view the current geographical position of the aircraft, typically in the form of an image of the aircraft or an icon that is superimposed over a geographical map. Additionally, passengers may also be provided an estimated time of arrival (ETA) to the aircraft's destination, as well as the aircraft's current airspeed, altitude, and heading direction. This information may be provided to passengers via cabin displays or individual seatback displays, depending on the particular configuration of the aircraft's on-board entertainment system.

In recent years, major airlines have also begun allowing passengers to access the Internet using their mobile devices or individual seatback displays on certain aircraft equipped with on-board communication systems for communicating with ground-based networks. Using the Internet, a passenger may access public websites that provide estimated travel times for ground-based transportation (such as driving, public transit, private hires, etc.) from a ground-based starting location to a desired destination.

However, the passenger is limited by the information sources used by public websites to generate the estimated travel times and suggested routes for ground-based transportation, which is not based on real-time information and does not take into account aspects of the air travel. In addition, the ground-based estimates will not take into consideration the amount of time it will take to get from the gate once the aircraft has landed at the destination airport to the passenger's desired ground-based transportation. Depending on the airport's physical layout, how much foot traffic the airport is currently experiencing, whether or not the passenger has checked baggage, and whether or not the passenger must first go through customs, among other variables, this could range from a few minutes to an hour or more. As such, any estimated time of arrival will be wholly inaccurate.

There is, therefore, an unmet demand for a multimodal travel estimation and routing system that dynamically provides time estimates and routing information from point-to-destination for multimodal travel based on real-time information.

BRIEF DESCRIPTION OF THE INVENTION

In one embodiment, a real-time multimodal travel estimation and routing system having a first mode for air-based travel and a second mode for ground-based travel includes an on-board data store communicatively coupled to a plurality of interactive displays aboard an aircraft. The plurality of interactive displays are configured to receive an input designating a ground-based destination, display one or more available ground-based travel options to the ground-based destination in the second mode, receive a request for one of the one or more available ground-based travel options, and display an estimated time of arrival to the ground-based destination based on first data stored on-board the aircraft for the second mode and real-time flight information for the aircraft for the first mode. The interactive display is further configured to display, after a predetermined time, an updated estimated time of arrival based on the first data for the second mode and the real-time flight information for the aircraft for the first mode.

The on-board data store is configured to, prior to takeoff of the aircraft, cache the first data corresponding to the one or more available ground-based travel options and travel estimation information for the second mode. The on-board data store is further configured to, during flight of the aircraft, cache second data corresponding to the request for the one of the one or more available ground-based travel options received by the plurality of interactive displays. And after takeoff of the aircraft, the on-board data store is further configured to receive an update of real-time information for at least one of the one or more available ground-based travel options or the travel estimation information in the second mode, and update the first data cached in the on-board data store with the update of real-time information for at least one of the one or more available ground-based travel options or the travel estimation information in the second mode.

In one embodiment, the real-time multimodal travel estimation and routing system further includes a flight management system communicatively coupled to the on-board data store, and the on-board data store is further configured to receive the real-time flight information for the aircraft for the first mode from the flight management system. In one embodiment, the real-time flight information includes at least one of a global positing system (GPS) position for the aircraft, a speed of the aircraft, and an altitude of the aircraft. In a further embodiment, the plurality of interactive displays are configured to display a map having one or more routes to the ground-based destination based on the requested one of the one or more available ground-based travel options superimposed thereon. In one embodiment, the one or more available ground-based travel options is one of a private hire, a ride-share, or a public transport.

In one embodiment, the travel estimation information comprises road traffic information. In another embodiment, the travel estimation information comprises transit times through a destination airport. In one embodiment, the estimated time of arrival is based on a remaining flight time to reach a destination airport, a transit time through the destination airport, and a travel time from the destination airport to the ground-based destination by the requested one or more available ground-based travel options. In one embodiment, the plurality of interactive displays are configured to display a remaining flight time to reach a destination airport, a transit time through the destination airport, and a travel time from the destination airport to the ground-based destination by the requested one or more available ground-based travel options. In one embodiment, the transit time through the destination airport includes a transit time through passport control or customs, and a transit time through baggage claim.

In one embodiment, the plurality of interactive displays are further configured to display one or more available lodging options adjacent the ground-based destination and receive a request for one of the one or more available lodging options. In one embodiment, the one or more available lodging options are displayed based on an availability corresponding to the estimated time of arrival to the ground-based destination. In another embodiment, the plurality of interactive displays are further configured to display one or more points of interest adjacent the ground-based destination and receive a request for one of the one or more points of interest, and wherein the one or more points of interest includes at least one of a restaurant, a landmark, a tour, and an entertainment venue. In one embodiment, the one or more points of interest are displayed based on an availability corresponding to the estimated time of arrival to the ground-based destination.

In one embodiment, a method for estimating a time of arrival to a ground-based destination having a first mode for air-based travel and a second mode for ground-based travel includes caching first data on an on-board data store aboard an aircraft prior to takeoff of the aircraft, the first data corresponding to one or more available ground-based travel options and travel estimation information for the second mode. The method further includes receiving an input designating the ground-based destination via an interactive display communicatively coupled to the on-board data store and receiving an input designating the ground-based destination via an interactive display communicatively coupled to the on-board data store. The method further includes displaying, via the interactive display, the one or more available ground-based travel options to the ground-based destination in the second mode, and receiving, via the interactive display, a request for one of the one or more available ground-based travel options.

The method further includes caching second data on the on-board data store, the second data corresponding to the request for the one or more available ground-based travel options received by the interactive display, and displaying, via the interactive display, an estimated time of arrival to the ground-based destination based on the first data stored on the on-board data store for the second mode and real-time flight information for the aircraft for the first mode. The method further includes receiving an update of real-time information for at least one of the one or more available ground-based travel options or the travel estimation information in the second mode during flight of the aircraft, and updating the first data stored on the on-board data store with the update of real-time information, and displaying, via the interactive display, an updated estimated time of arrival based on the updated first data for the second mode and real-time flight information after a predetermined time.

In one embodiment, the method further includes receiving the real-time flight information from a flight management system communicatively coupled to the on-board data store. In another embodiment, the real-time flight information includes at least one of a GPS position for the aircraft, a speed of the aircraft, and an altitude of the aircraft. In one embodiment, the method further includes displaying, via the interactive display, a map having one or more routes to the ground-based destination based on the requested one of the one or more available ground-based travel options superimposed thereon. In one embodiment, the one or more available ground-based travel options is one of a private hire, a ride-share, or a public transport. In one embodiment, the travel estimation information comprises road traffic information. In another embodiment, the travel estimation information comprises transit times through a destination airport.

In one embodiment, the estimated time of arrival is based on a remaining flight time to reach a destination airport, a transit time through the destination airport, and a travel time from the destination airport to the ground-based destination by the requested one or more available ground-based travel options. In one embodiment, the method further includes displaying, via the interactive display, a remaining flight time to reach a destination airport, a transit time through the destination airport, and a travel time from the destination airport to the ground-based destination by the requested one or more available ground-based travel options. In one embodiment, the transit time through the destination airport includes a transit time through passport control or customs, and a transit time through baggage claim.

In one embodiment, the method further includes displaying, via the interactive display, one or more available lodging options adjacent the ground-based destination and receiving, via the interactive display, a request for one of the one or more available lodging options. In one embodiment, the one or more available lodging options are displayed based on an availability corresponding to the estimated time of arrival to the ground-based destination. In another embodiment, the method further includes displaying, via the interactive display, one or more points of interest adjacent the ground-based destination, and receiving, via the interactive display, a request for one of the one or more points of interest, wherein the one or more points of interest includes at least one of a restaurant, a landmark, a tour, and an entertainment venue. In one embodiment, the one or more points of interest are displayed based on an availability corresponding to the estimated time of arrival to the ground-based destination.

DETAILED DESCRIPTION OF THE INVENTION

Figure 1:
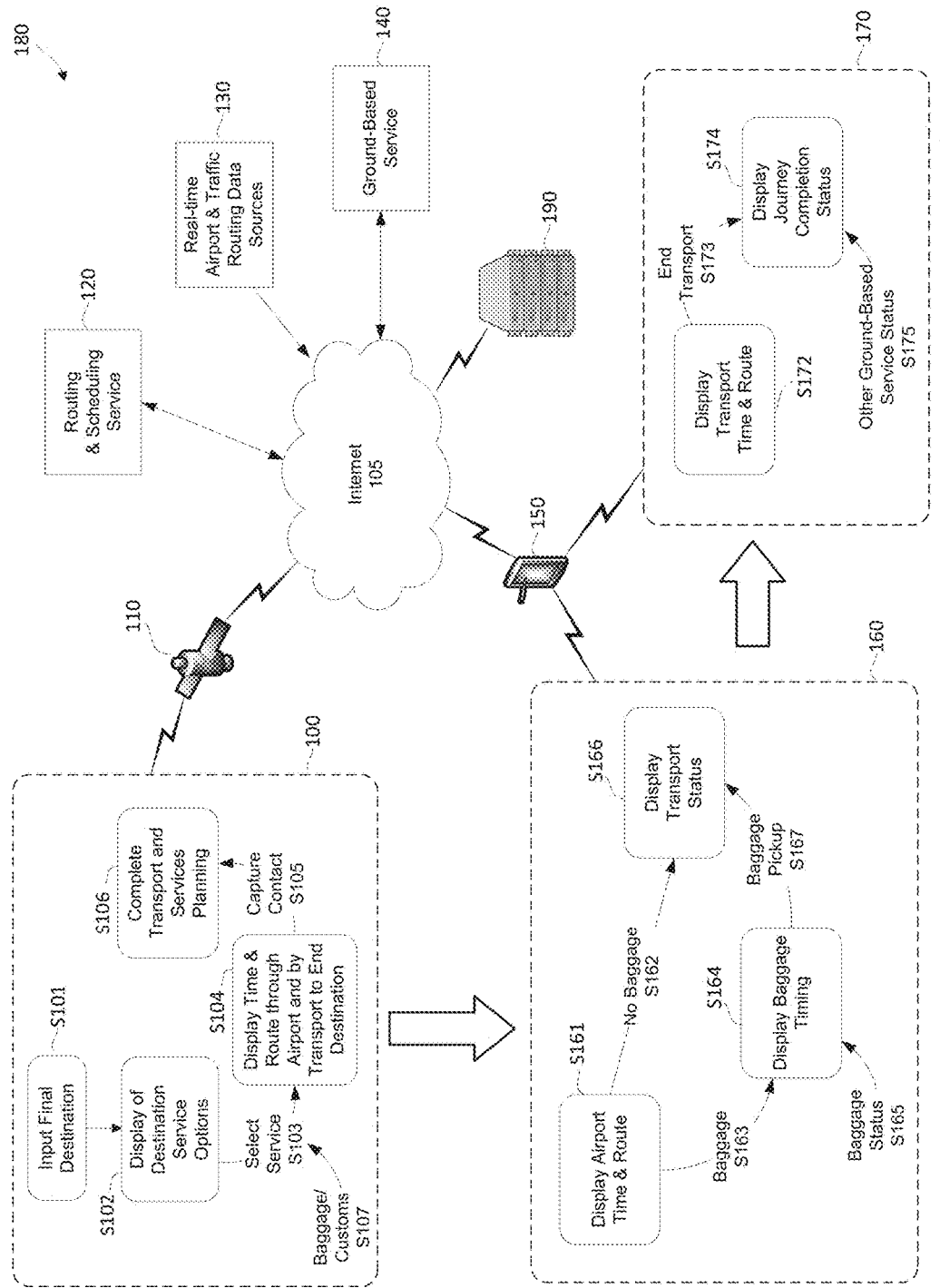
FIG. 1 is a block diagram of method steps for generating real-time route information and estimates using a multimodal travel estimation and routing system, according to one embodiment of the invention.

FIG. 1 is a block diagram of method steps for generating real-time route information and estimates using a multimodal travel estimation and routing system 180, according to one embodiment of the invention. As shown in FIG. 1, the real-time multimodal travel estimation and routing system 180 is configured to provide real-time estimates and route information to a user while in transit aboard an aircraft 100, through an airport 160, and aboard ground transportation 170 to the passenger's personalized destination. In one embodiment, where the passenger has a layover or transfer at an intermediate airport before reaching their destination airport, the multimodal travel estimation routing system 180 may be used to provide an estimate to a transfer gate through the airport 160.

First, while aboard the aircraft 100 in transit to a destination airport, at step S101 the user provides a desired personalized destination to the real-time multimodal travel estimation and routing system 180. In one embodiment, the desired personalized destination includes a transfer terminal and gate for the user's next flight where the user is a transfer passenger. In one embodiment, the user accesses the real-time multimodal travel estimation and routing system 180 via his or her individual seatback display connected to the on-board entertainment and communications network of the aircraft 100. In another embodiment, the user may access the real-time multimodal travel estimation and routing system 180 via a mobile device 150, such as a smartphone or a tablet, connected to the on-board wireless network of the aircraft 100.

Optional information, including the user's identifying information and flight information, and the like, may also be provided to the real-time multimodal travel estimation and routing system 180 at the outset to streamline subsequent processes. In another embodiment, the user may set up a user account that stores the user's travel information and preferences when using the real-time multimodal travel estimation and routing system 180. For example, where the user is a transfer passenger, the user may provide a ticket number or flight number to the real-time multimodal travel estimation and routing system 180, and the real-time multimodal travel estimation and routing system determines the transfer terminal and gate at the destination airport for the user's next flight.

After the user inputs the desired destination, the real-time multimodal travel estimation and routing system 180 accesses ground-based service 140 via the Internet 105 over a communications satellite 110 or any equivalent wireless services (such as a cellular network), to retrieve the ground service options available, such as ground transportation to take the passenger to the passenger's desired destination, and a delivery service to deliver food to the passenger after he or she has arrived at the destination, if applicable (i.e. the passenger is not transferring to another flight). In one embodiment, the ground-based service 140 comprises a plurality of ground-based service provider systems coupled to the real-time multimodal travel estimation and routing system 180.

The ground-based service provider systems may include, for example, car rental providers, private hire providers (such as a taxi or ride-sharing service), public transportation providers (such as the bus, subway, train, ferry, etc.), food delivery and other delivery services, physical wellness services (such as massages, personal grooming, etc.), and the like. In addition, information regarding available lodging information (such as hotels, motels, short-term rentals, and the like) adjacent the desired destination, as well as points of interest (such as restaurants, landmarks, tours, entertainment venues, and the like) may also be presented to the passenger for booking. This information may be provided in a number of different ways, such as only those available lodgings or points of interest within a given distance (i.e. 5 to 10 miles) of, and/or within a period of time the passenger is estimated to arrive at the desired destination are presented. The ground-based service provider systems provide ground transport service 140 with information regarding the availability, location, cost, schedule, and/or delivery schedule for their respective ground-based service.

Where the user is transferring to another flight after arriving at the destination airport, the real-time travel estimation and routing system 180 may provide options to manage the user's travel itinerary, including booking a new flight (i.e. an earlier flight where the passenger's flight is estimated to arrive at the destination airport ahead of schedule or a later flight where the passenger's flight is arriving behind schedule and the passenger will not be able to make the originally booked flight). The real-time travel estimation and routing system 180 may also display a flight status of the passenger's next flight (i.e. on-time, delayed, canceled), and any other relevant information related to the passenger's next flight.

At step S102, a display of the available ground-based service options is presented to the passenger, if applicable. In various embodiments, the ground transportation options may include the passenger's personal vehicle, a rental vehicle, a private hire, public transportation, or any other type of suitable ground transportation. Delivery service options may include food delivery, grocery deliveries, product deliveries, or any other type of delivery service. At step S103, the passenger selects the desired ground transportation 170 and other ground-based services from the available ground-based service options, if applicable. Optionally, where the user has logged into his or her user account at step S101, steps S102 and S103 may be skipped where the user's account specifies the user's preference for a specific ground-based service options.

In one embodiment, the user is prompted at step S103 to further select at step S107 whether the user has checked any baggage (and if so, how many pieces), and whether the user needs to pass through customs. This information may be requested when the user is transferring to another aircraft at the destination airport as well. In other embodiments where the user has provided his or her identifying information and flight information, or where the user has accessed his or her user account, the real-time multimodal travel estimation and routing system 180 may automatically retrieve baggage and customs information for the user from the aircraft airline's systems. In one embodiment, real-time airport & traffic routing data sources 130 includes the aircraft airline's systems.

The real-time multimodal travel estimation and routing system 180 then sends the user's selections to the routing & scheduling service 120. The routing & scheduling service 120 returns the possible routing options through the airport 160 and for the selected ground transportation 170 (if applicable). The real-time multimodal travel estimation and routing system 180 further retrieves real-time airport & traffic information from real-time airport & traffic routing data sources 130. The real-time multimodal travel estimation and routing system 180 then determines the most efficient route through the airport 160 and for the ground transportation 170 to reach the user's personalized destination (if applicable).

Real-time airport data sources may include real-time GPS and cellular tower triangulation information from wireless devices of travelers that have arrived at the airport 160 ahead of the user who are travelling along the same route as they travel through the airport 160, Bluetooth and Wi-Fi infrastructures deployed at the airport 160 that may also provide more granular/accurate location tracking than GPS and cellular tower tracking of wireless devices inside three-dimensional building complexes such as airport 160, wireless baggage tracking tags and bag tracking services for baggage of other travelers that have previously arrived at the airport 160, and the like.

Real-time traffic data sources may include real-time traffic status feeds from public entities, such as the department of transportation for the region, or private real-time traffic monitoring entities, real-time sources from private hire providers (such as GPS tracking of vehicles for ride-sharing services, and dispatch/GPS monitoring services for taxis), real-time sources from public transportation services (either using GPS or other triangulation information), and the like.

At step S104, the real-time multimodal travel estimation and routing system 180 displays the most efficient route through the airport 160 and by the ground transportation 170, along with the estimated time through the airport 160 and for the ground transportation 170 (if applicable) to reach the user's personalized destination. The real-time estimate of the aircraft 100 to arrive at the airport 160 based on GPS, airspeed, altitude, and heading information from the flight management system of the aircraft 100 is also displayed to the user to provide a complete estimate of the amount of time it will take the user to arrive at his or her destination.

In one embodiment, in addition to the complete estimate to arrive at the user's personalized destination, the user may be presented with the estimated amount of time to the airport 160, the estimated amount of time to transit through the airport 160 from the gate to customs and/or baggage claim (if applicable), the estimated amount of time to pass customs (if applicable), the estimated amount of time to pick up their baggage (if applicable), the estimated amount of transit from the terminal of the airport 160 to the pick-up location of the ground transportation 170, and/or any other estimated transit phase (such as terminal to terminal shuttles or connecting gate) that material impacts the transit time through the airport 160, and the estimated amount of time for the ground transportation 170 to transit to the user's personalized destination (if applicable).

Where the user is not a transfer passenger, at step S105, the user is prompted to confirm his or her selection of the ground transportation 170 and any other ground-based services after being provided the estimate information at step S104, or select different ground-based service options. If the user wishes to select a different ground-based service option at step S105, the user is returned to step S102 and is displayed the list of ground-based service options available. In another embodiment, the user is provided with both the list of different ground transportation options at step S102, along with the complete real-time estimate for the amount of time it will take to reach the user's personalized destination (including the estimated time to arrive at the airport 160 and transit through the airport 160) for each available ground transportation option. In this embodiment step S104 may be skipped.

If, at step S105, the user confirms the selected ground transportation 170 and any other ground-based service options, the user may be prompted to provide or confirm additional information book the selected ground-based services if the user has selected a rental vehicle, a private hire or public transportation, and has ordered pizza delivery to be delivered as the passenger arrives at their personalized destination, for example. This information may include the user's identification, an email address, payment information, etc. Again, the user may avoid having to provide additional information if the user's account specifies the requisite information to complete the booking.

At step S106, the user's selected ground-based services are booked. The real-time multimodal travel estimation and routing system 180 transmits the booking to the ground-based service 140 and returns a confirmation that the ground-based services have been booked. In one embodiment, a confirmation number is displayed to the user. In another embodiment, a confirmation number is emailed, texted, or otherwise electronically communicated to the user. In yet a further embodiment, map with the user's route through the airport 160 to the pick-up location of the ground transportation 170 is displayed and/or transmitted to the user.

In one embodiment, the real-time multimodal travel estimation and routing system 180 automatically updates the real-time estimate to the user to notify the user of any changes in the previously provided estimate and routing information. The real-time multimodal travel estimation and routing system 180 may also provide the ground transport service 140 with updated real-time estimates for the time the user will arrive at the pick-up location for the selected ground transportation 170. This way, the ground transport service 140 is able to plan ahead and arrange for the ground transportation 170 to arrive at the pick-up location at or about the same time as the user.

After the aircraft 100 has landed at the airport 160, at step S161, the user's mobile device 150 accesses the routing & scheduling service 120 and the real-time airport & traffic routing data sources 130, retrieves the routing information and estimated time to transit through the airport 160, and displays the information to the user. If the user has checked baggage, at step S163, the user is routed to the baggage claim and at step S164, the estimated time for the user's baggage to arrive at the baggage claim is displayed. In one embodiment, at step S165, the user's baggage status (for example, on the aircraft 100, in transit to the terminal of the airport 160, arriving at the baggage claim, etc.) is also displayed to the user. In one embodiment, where the user must also pass through customs and immigration, the estimated time to transit through customs and immigration is also displayed to the user.

Where the user is not a transfer passenger, at step S167, the user confirms pickup of the user's baggage and the user's mobile device, at step S166, retrieves the status of the ground transportation 170 from ground transport service 140, and displays the status of the ground transportation 170 (for example, awaiting pick-up, on the way, will arrive in x minutes, etc.) to the user. If the user did not check any baggage, or does not require any other intermediate activity in the airport 160 before heading to the pick-up location, then at step S162 the user confirms his or her arrival at the terminal and the mobile device 150 directly displays the status of the ground transportation 170.

After the user has arrived at the pick-up location for the ground transportation 170, and is in transit to the user's personalized destination, at step S172, the user's mobile device 150 accesses the routing & scheduling service 120 and the real-time airport & traffic routing data sources 130, and displays the route for the ground transportation 170 to the user's personalized destination and the estimated time it will take to arrive. At step S173, the ground transportation 170 arrives at the user's personalized destination, and at step S174, the user's mobile device displays a journey completion status to the user. In one embodiment, where the user has ordered other ground-based services (such as food delivery), at step S175 the ground-based service status is also displayed on the user's mobile device. The ground-based service status may include an indication of whether the ground-based service is departing, in transit, or about to arrive at the user's personalized destination, along with an estimated time for the ground-based service to arrive at the user's personalized destination.

In one embodiment, a central server 190 comprising one or more computer systems is used to consolidate management of information to and from routing & scheduling service 120, real-time airport & traffic routing data sources 130, and ground transport service 140. In this embodiment, the seat-back display on board the aircraft 100 or mobile device 150 of the user need only access a centralized location in order to receive and transmit information from routing & scheduling service 120, real-time airport & traffic routing data sources 130, and ground transport service 140. In one embodiment, the central server 190 may comprise a cloud computing platform. In other embodiments, the central server 190 may comprise one or more computers installed on the aircraft 160, or any combination of computing systems based on the ground and in the air.

In one embodiment, the central server 190 continually builds a historical record and statistical averages of the real-time information received from the real-time airport & traffic routing data sources 130. By doing so, the central server 190 can provide time estimates and routing information based on either current real-time information received from the real-time airport & traffic routing data sources 130, or the historical record and statistical averages where there may not be a statistically sufficient number of current real-time information sources available for a realistic time estimate and route. In one embodiment, the central server 190 regularly copies the historical record and statistical averages information to an on-board data storage location aboard the aircraft 100. This way, even if the aircraft 100 experiences a loss of connectivity, the user can still provided with a complete time estimate and routing information based upon the latest available current real-time information prior to the loss of connectivity and the historical record and statistical averages information.

Figure 2:
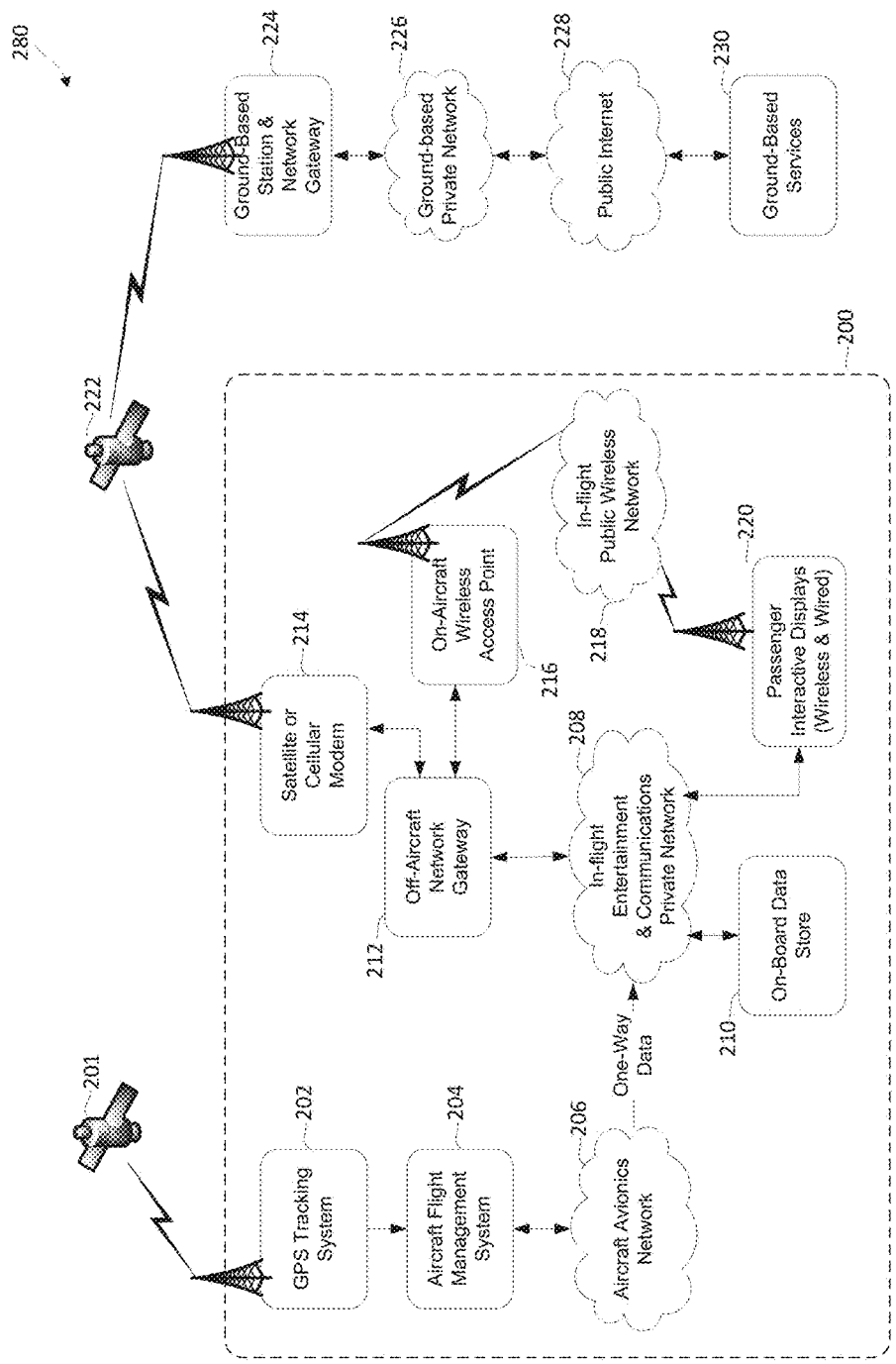
FIG. 2 is a network diagram of a real-time multimodal travel estimation and routing system, according to one embodiment of the invention.

FIG. 2 is a network diagram of a real-time multimodal travel estimation and routing system 280, according to one embodiment of the invention. As shown in FIG. 2, global positioning system (GPS) satellite 201 is connected to the GPS tracking system 202 of the aircraft 200. The GPS satellite 201 provides geographical positioning information to the GPS tracking system 202, which then feeds the information to the aircraft light management system 204. The aircraft flight management system 204 tracks the airspeed, altitude, and heading direction, among other information, in real-time from various sensors and instruments installed aboard the aircraft 200 to help guide the aircraft 200 along the planned flight route. In other embodiments, the position and/or other information related to the aircraft 200 (such as airspeed, altitude, heading direction, etc.) may be provided by any suitable flight position tracking system that determines the current position and/or information related to the aircraft 200, including, for example, a direct GPS tracking system, an aircraft proximity warning system, a radio-frequency broadcast system, a mobile device coupled to a GPS system, etc.

The aircraft avionics network 206 provides one-way data flow of the real-time geographical positioning, airspeed, altitude, and heading direction information to the in-flight entertainment & communications private network 208. The aircraft avionics network 206 only provides one-way data flow in order to prevent unauthorized access to the aircraft flight management system and other critical avionics equipment within the aircraft avionics network 206. The information provided by the aircraft avionics network 206 may be used to dynamically generate an estimated time to arrive at the destination airport while the aircraft 200 is in transit. The in-flight entertainment & communications private network 208 links the on-board data store 210, the passenger interactive displays 220 (for example, the passenger's individual seat-back display or a wireless mobile device) to the off-aircraft network gateway 212. On-aircraft wireless access point 216 which provides in-flight public wireless network 218 is also connected to the off-aircraft network gateway 212.

The off-aircraft network gateway 212 is connected to a communications satellite or cellular modem 214 that is configured to communicate with a communications satellite 222 transmitting and receiving information from the ground-based station & network gateway 224. In this manner, the ground-based services 230 that provide real-time routing information, estimated transit times for ground-based transit, and ground-based service information is able to send this information through the public internet 228 and the ground-based private network 226 to the in-flight entertainment & communications private network 208 aboard the aircraft 200 to be displayed by the passenger interactive displays 220 along with the estimated time to reach the destination airport to provide a complete point-to-destination time estimate based upon real-time data sources both in the air and on the ground. Information received from the ground-based services 230 may also be cached in the on-board data store 210 so that an estimate may still be provided based upon the latest real-time information in case the aircraft 200 experiences a loss in connectivity between the off-aircraft network gateway 212 and the ground-based station & network gateway 224.

Ground-based service information may be cached in the on-board data store 210 from the ground-based services 230 prior to each flight before takeoff based on the destination airport of the aircraft 200. The cached ground-based service information may be updated during the flight depending on available connectivity between the off-aircraft network gateway 212 and the ground-based station & network gateway 224. In this manner, the real-time multimodal travel estimation and routing system 280 can provide a seamless user experience to users traveling aboard the aircraft 200, providing the latest available routing information, estimated transit times, and ground-based service information for planning and booking ground-based transportation and other services, despite the practical real-world limitations of connectivity between the off-aircraft network gateway 212 and ground-based station & network gateway 224 (e.g., loss of connectivity while in-flight due to weather, environmental interference, hardware limitations, etc.).

Similarly, the requested booking transaction for ground-based transportation or other services may be cached in the on-board data store 210 for completion after the aircraft 200 arrives at the destination airport. After landing at the destination airport, the cached booking transaction can be completed via the off-aircraft network gateway 212 transmitting the booking transaction cached in the on-board data store 210 to the ground-based station & network gateway 224. The ground-based station & network gateway 224 passes the requested booking transaction to the ground-based services 230. By caching the booking transaction made in-flight and delaying the completion of the transaction until after the aircraft 200 has landed at the destination airport, any potential issues that may arise due to a loss of connectivity between the off-aircraft network gateway 212 and ground-based station & network gateway 224 while the aircraft 200 is in-flight can be avoided.

Additionally, caching the booking transaction in the on-board data store 210 for completion after the aircraft 200 lands at the destination airport provides the desired ground-based transportation and other services with more certainty regarding the timing and scheduling of the requested service as oftentimes, the estimated arrival time of the aircraft 200 may be affected by a number of environmental factors, such as airport congestion, inclement weather, failed landing attempts, etc., requiring the ground-based transportation or other services to make necessary adjustments to ensure that the requested ground-based transportation or other services arrive in a timely manner. Such unanticipated adjustments will necessarily result in inefficiencies that could otherwise be avoided by delaying completion of the transaction until after the aircraft 200 arrives at the destination airport, thereby assuring the requested ground-based transportation or other services that the customer has arrived and allows for more accurate and efficient scheduling for the requested ground-based transportation or other services.

Figure 3:
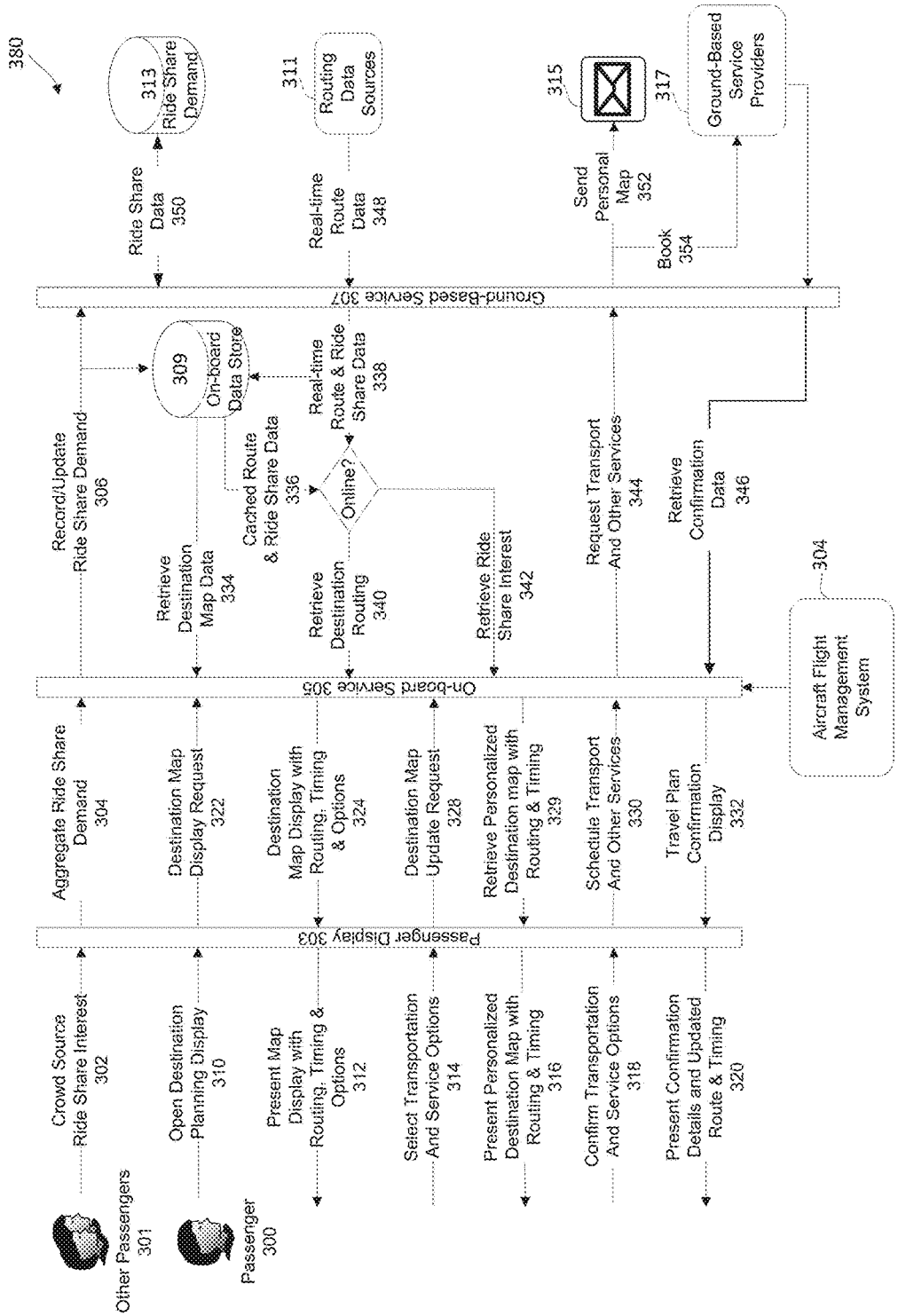
FIG. 3 is a functional diagram of the dataflow of a real-time multimodal travel estimation and routing system while in transit aboard an aircraft, according to one embodiment of the invention.

FIG. 3 is a functional diagram of the dataflow of a real-time multimodal travel estimation and routing system 380 while in transit aboard an aircraft, according to one embodiment of the invention. As shown in FIG. 3, passenger 300 and other passengers 301 aboard an aircraft may access the real-time multimodal travel estimation and routing system 380 via a passenger display 303. In one embodiment, passenger display 303 comprises a seatback or wireless display connected to the on-board entertainment and communications network of the aircraft. In another embodiment, passenger display 303 comprises a mobile device, such as a smartphone or a tablet, connected to the on-board wireless network of the aircraft.

When passenger 300 opens the destination planning display 310 on the passenger display 303, the passenger display 303 sends a destination map display request 322 to the on-board service 305. In one embodiment, the on-board service 305 comprises the on-board entertainment and communications network of the aircraft. In another embodiment, the on-board service 305 comprises application software installed on a mobile device connected to the on-board wireless network and the on-board entertainment and communications network of the aircraft. In one embodiment, the destination map display request 322 includes the desired personalized destination of the passenger 300.

In response to the destination map display request 322, the on-board service 305 retrieves destination map data 334 from the on-board data store 309. Additionally, if the on-board service 305 is connected to the ground-based service 307 (for example, as shown in FIG. 2), then real-time route data 348 from routing data sources 311 and ride share data 350 from ride share demand 313 are retrieved by the on-board service 305 as destination routing 340 and ride share interest 342, respectively. Additionally, real-time route & ride share data 338 is cached on the on-board data store 309. In one embodiment, real time route data 348 from routing data sources 311 comprises information from real-time airport and ground-transportation sources along with routing information through the airport and for ground transportation to reach the personalized destination of the passenger 300.

Conversely, if connectivity from the on-board service 305 to the ground-based service 307 is unavailable, then cached route & ride share data 336 from the on-board data store 309 is retrieved by the on-board service 305 as destination routing 340 and ride share interest, 342, respectively. In this manner, the real-time multimodal travel estimation and routing system 380 can still provide the passenger 300 with a complete time estimate and route information from the passenger's current location aboard the aircraft to the personalized destination of the passenger 300, even if the on-board service 305 is unable to connect to the ground-based service 307. As previously discussed, the on-board data store 309 can cache route & ride share data 336, real-time route data 348, data from ground-based service providers 317, and any other data from ground-based service 307 for the destination of the passengers 300 prior to takeoff, and may periodically or continually update the cached data with updated data from their corresponding real-time sources based on the availability of the connection between the on-board service 305 and the ground-based service 307 while the aircraft is in flight.

The on-board service 305 takes the retrieved destination map data 334, the retrieved destination routing 340, the retrieved ride share interest 342, along with information retrieved from the aircraft flight management system 304 (such as GPS location information, airspeed, altitude, and direction heading) and provides a destination map display with routing timing & ground-based service options 324 to the passenger display 303 to be presented to the passenger 300 as a display with routing, timing and ground-based service options 312.

In one embodiment, the display with routing, timing and ground transportation options 312 includes a complete point-to-destination time estimate and routing information to the personalized destination of the passenger 300 for each available ground-transportation option, and an estimated time of arrival at the personalized destination for any other ground-based service options selected by the passenger 300. In one embodiment, the display with routing, timing and ground transportation options 312 includes time estimates and route information for each phase of the journey of the passenger 300. For example, a time estimate and route information while the passenger 300 is in transit aboard the aircraft, a time estimate and route information while the passenger 300 is in transit through the destination airport, a time estimate and route information while the passenger 300 is in transit aboard the ground transportation to the personalized destination of the passenger 300.

The passenger 300 selects a transportation and ground-service options 314 from the map display with route timing & ground-based service options 312. In one embodiment, the ground transportation options include an option to share ground transportation with other passengers 301 or other travelers on other aircraft headed to the same destination airport. Collecting information from a group of individuals, such as passenger 300 and other passengers 301, may be referred to as crowd sourcing.

In one embodiment, the option to share ground transportation with other passengers 301, or other travelers on other aircraft, is limited to those individuals who will arrive at the destination airport transit through the airport at a similar time, for example, within 10, 15, or 30 minutes of each other. In one embodiment, the passenger 300 can define the time and the option to share ground transportation with others only displays those other individuals who want to share ground transportation and will arrive and transit through the airport close to the same time.

Other passengers 301 are similarly displayed destination and planning display 310 on their respective passenger displays 303 as the passenger 300. Other passengers 301 may, via the passenger display 303, provide the real-time multimodal travel estimation and routing system 380 with their crowd source ride share interest 302 indicating their desire to share ground transportation to their respective destination with one or more of the other passengers 301 as well. The aggregated ride share demand 304 is sent to the on-board service 305, which in turn records/updates the ride share demand 306 within the on-board data store 309.

In one embodiment, the ride share demand 306 is also sent to the ground-based service 307, which in turn sends the ride share demand 306 as ride share data 350 to update/record ride share demand 313 based upon the aggregated ride share demand 304 of the passenger 300 and other passengers 301. The ride share demand 313 records/updates the ride share demand of a plurality of aircraft arriving at the destination airport so the passenger 300 may be presented with the option of sharing ground transportation from travelers on other aircraft headed to the same destination airport as well as other passengers 301.

In response to the selection of the transportation and ground-based service options 314, the passenger display 303 sends a destination map update request 328 to the on-board service 305, which returns a personalized destination map with routing and timing 329 for the specific ground transportation option selected by the passenger 300, which is then displayed to the passenger 300 via the passenger display 303 as a personalized destination map with routing & timing 316. The passenger 300 can then confirm the selected transportation option 318 via the passenger display 303, which in turn sends a schedule transport and other ground-based services 330 request to the on-board service 305. The on-board service 305 requests transport 344 from the ground-based service 307. The ground-based service 307 books 354 the selected ground transportation and other ground-based services options with the respective ground-based service providers 317. As also previously discussed, the requested transport and other services 344 of the passenger 300 may be cached in the on-board data store 309, and then transmitted to the ground-based service 307 for completion after the aircraft lands at the destination airport so that the ground-based service providers 317 can better schedule the delivery of the requested transport and other services 344 to the passenger 300.

Optionally, in one embodiment, the ground-based service 307 emails 315 a copy of the passenger's personal map 352 detailing the route and timing information for the selected ground transportation option to the passenger 300. In other embodiments, emails 315 may be any form of asynchronous mobile communication, such as text messages. In one embodiment, emails 315 may comprise both an email and a text message. This may be helpful where the passenger 300 does not have a mobile device, or if the passenger 300 does have access to a mobile device, the mobile device is unable to connect to the ground-based service 307 while transiting through the airport and when aboard the selected ground transportation to his or her personalized destination.

If the passenger 300 does not have a mobile device, the passenger 300 may be able to access a computer terminal at the destination airport and print out a copy of email 315 (or text message, or any other asynchronous mobile communication) with the route and timing information for the selected ground transportation. If the passenger 300 does have a mobile device, the passenger 300 may open the email 315 (or text message, or any other asynchronous mobile communication) aboard the aircraft while connected to the on-board wireless network and cache the email 315 on the local storage of the mobile device so that even if the mobile device cannot connect to the ground-based service 307 while transiting through the airport or when aboard the selected ground transportation to the personalized destination of the passenger 300, the passenger 300 will still be able to access the route and estimate information.

After the selected ground transportation is booked 354 with the ground-based service providers 317, the on-board service 305 retrieves the confirmation data 346 for the booking 354 from the ground-based service 307. The on-board service 305 sends the travel plan confirmation display 332 to the passenger display 303, and the passenger 300 is presented with the confirmation details, along with updated route & timing information 320 if the routing and/or timing has changed since the passenger 300 was last presented with this information. In one embodiment, the real-time multimodal travel estimation and routing system 380 periodically provides updated route and timing information to the passenger 300 via the passenger display 303. In another embodiment. The real-time multimodal travel estimation and routing system 380 provides updated route and time estimate information to the passenger 300 when there is a change in the time estimate or route information from when the information was last provided to the passenger 300.

Figure 4:
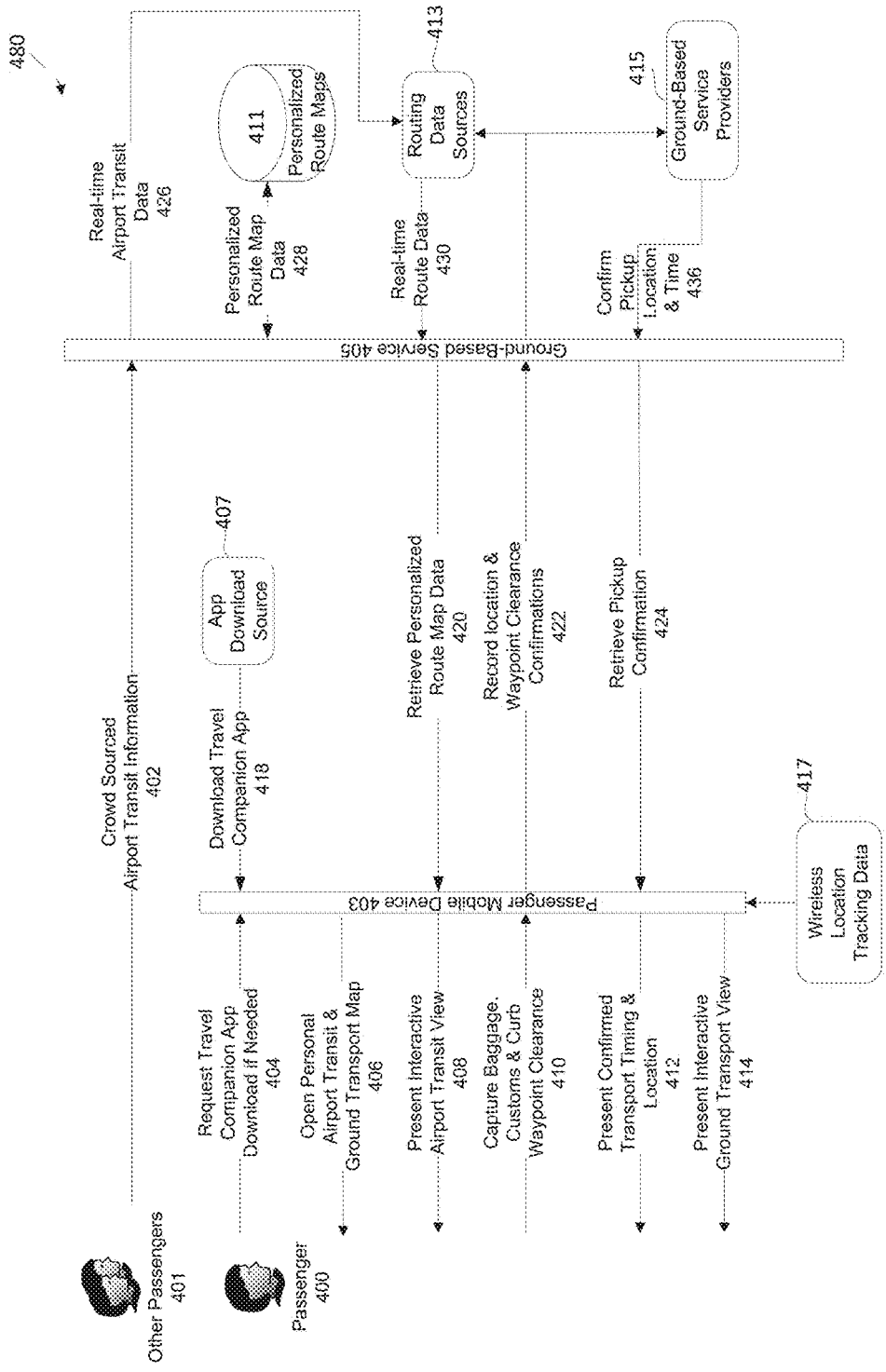
FIG. 4 is a functional diagram of the dataflow of a real-time multimodal travel estimation and routing system while in transit through an airport, according to one embodiment of the invention.

FIG. 4 is a functional diagram of the dataflow of a real-time multimodal travel estimation and routing system 480 while in transit through an airport, according to one embodiment of the invention. As shown in FIG. 4, other passengers 401 that have passed through the airport ahead of the passenger 400 contributes crowd-sourced airport transit information 402 to the ground-based service 405 of the real-time multimodal travel estimation and routing system 480. In one embodiment, the crowd sourced airport transit information 402 may be collected by using GPS, cellular, and/or wireless networks (including Wi-Fi and Bluetooth) to triangulate the mobile devices of the other passengers 401 as they transit through the airport. In one embodiment, the crowd sourced airport transit information 402 may further comprise waypoint clearance confirmations provided by the other passengers 401 as they pass through customs or the baggage claim, for example. The ground-based service 405 then provides the crowd-sourced real-time airport transit data 426 to routing data sources 413.

After the passenger 400 disembarks from the aircraft, the passenger may access the real-time multimodal travel estimation and routing system 480 through the passenger's mobile device 403. In one embodiment, a companion application is required to access the real-time multimodal travel estimation and routing system 480 from the passenger's mobile device 403. The companion application comprises software designed to run on mobile device 403. In this embodiment, the passenger 400 may input a command 404 to the passenger's mobile device 403 to download the companion application 418 from an application download source 407. In one embodiment, a link to the application download source 407 is transmitted (via email, text message, or both, for example) to the passenger 400 after the passenger 400 confirms the transportation and service options 318 shown in FIG. 3. The application download source 407 may be, for example, the Google™ Play Store™, the Apple Store™, or a website.

Once the companion application 418 is installed on the passenger's mobile device 403, the passenger's requested transportation and service options 318 may be automatically populated within the companion application 418 and the customer need only hit "confirm," or some other similar convenient and straight-forward mechanism in order to complete the booking for the requested transportation and service options 318 (i.e. the transaction is sent to the ground-based service providers 415 for fulfillment). In one embodiment, the ground-based service 405 receives the requested transportation and service options 318 that is cached in the on-board data store and compresses the information into a link that can be delivered to the passenger 400 via email, text message, SMS, or any other suitable communications medium, which when selected, causes the passenger 400's mobile device 403 (or the computer device the passenger 400 uses to select the link if the passenger 400 does not have a mobile device 403) to automatically open (or download and then open) the companion application, or a website any other suitable software application associated with the requested ground-based service providers 415, that has the requested transportation and service options 318 automatically populated for the passenger 400 to easily confirm and complete the transaction.

Once the companion app is installed on the passenger's mobile device 403, the passenger 400 can open his or her personal airport transit & ground transport map 406 containing routing and time estimate information to transit the airport to get to the pick-up location of the ground transportation previously selected by the passenger 400. After the passenger 400 has elected to open the personal airport transit & ground transport map 406, the passenger mobile device 403 retrieves the personalized route map data 420 from the ground-based service 405. The ground-based service 405 receives real-time rout data 430 from routing data sources 413 and passes it to the passenger mobile device in the form of personalized route map data 420. The passenger mobile device 403 then displays the personalized route map data 420 in the form of an interactive airport transit view 408.

In one embodiment, the interactive airport transit view 408 may comprise a map of the airport along with an icon or indicator representing the current location of the passenger 400 and the route through the airport for the passenger 400. The current location of the passenger 400 is obtained using wireless location tracking data 417. In one embodiment, the wireless location tracking data 417 is provided by GPS. In another embodiment, the wireless location tracking data 417 is provided by cellular or other wireless networks, such as Wi-Fi or Bluetooth wireless systems in the airport, that may be used to triangulate the location of the passenger mobile device 403.

The interactive airport transit view 408 may also include estimate times for transiting through the airport, including a total estimated time to reach the pick-up location of the selected ground transportation, the estimated time to claim any baggage (if applicable), and the estimated time through customs (if applicable). The real-time information to generate the time estimates to transit through the airport is provided by the real-time route data 430 from the routing data sources 413, and delivered to the passenger mobile device 403 along with the personalized route map data 420.

As the passenger 400 transits through the airport, the passenger mobile device 403 may capture waypoint clearance information 410 as the passenger 400 passes through baggage claims (if applicable), customs (if applicable), and when the passenger 400 reaches the curb or pick-up location for the selected ground transportation. The ground-based service 405 records the location of the passenger mobile device 403 and waypoint clearance confirmations 422 and sends it to routing data sources 413 so that the real-time transit information through the airport for the passenger 400 can be used to provide time estimates to other passengers that come after the passenger 400.

In one embodiment, the ground-based services 405 further reports the location of the passenger mobile device 403 and waypoint clearance confirmations 422 to the ground-based service providers 415. In this embodiment, the selected ground transportation may be a private hire (for example a taxi or ride-sharing service). By providing the location of the passenger mobile device 403 and the waypoint clearance confirmations 422 to the ground-based service providers 415, the selected private hire is able to accurately determine the real-time location of the passenger 400 to ensure that they arrive prior to the passenger 400 arrives at the pick-up location or otherwise provide an estimated time to arrive at the pick-up location to the passenger 400. Where the passenger 400 has also selected other ground-based service options, such as food delivery to be delivered at the passenger 400's personalized destination, the location of the passenger mobile device 403 and the waypoint clearance confirmations 422, along with real-time route data from routing data sources 413, allows the selected ground-based service providers 415 to prepare the requested service for delivery ahead of time so that the selected service arrives at the personalized destination of the passenger 400 at or about the same time as the passenger 400.

The selected ground-based service provider 415 confirms the ground transportation pickup location & time 436 with the ground-based service 405, and the passenger mobile device 403 retrieves the pickup confirmation 424 and displays the confirmed transport timing & location 412 to the passenger 400. After the passenger 400 boards the ground transportation, the passenger mobile device 403 presents interactive ground transport view 414. Interactive ground transport view 414 will be explained in further detail in connection with FIG. 5.

Figure 5:
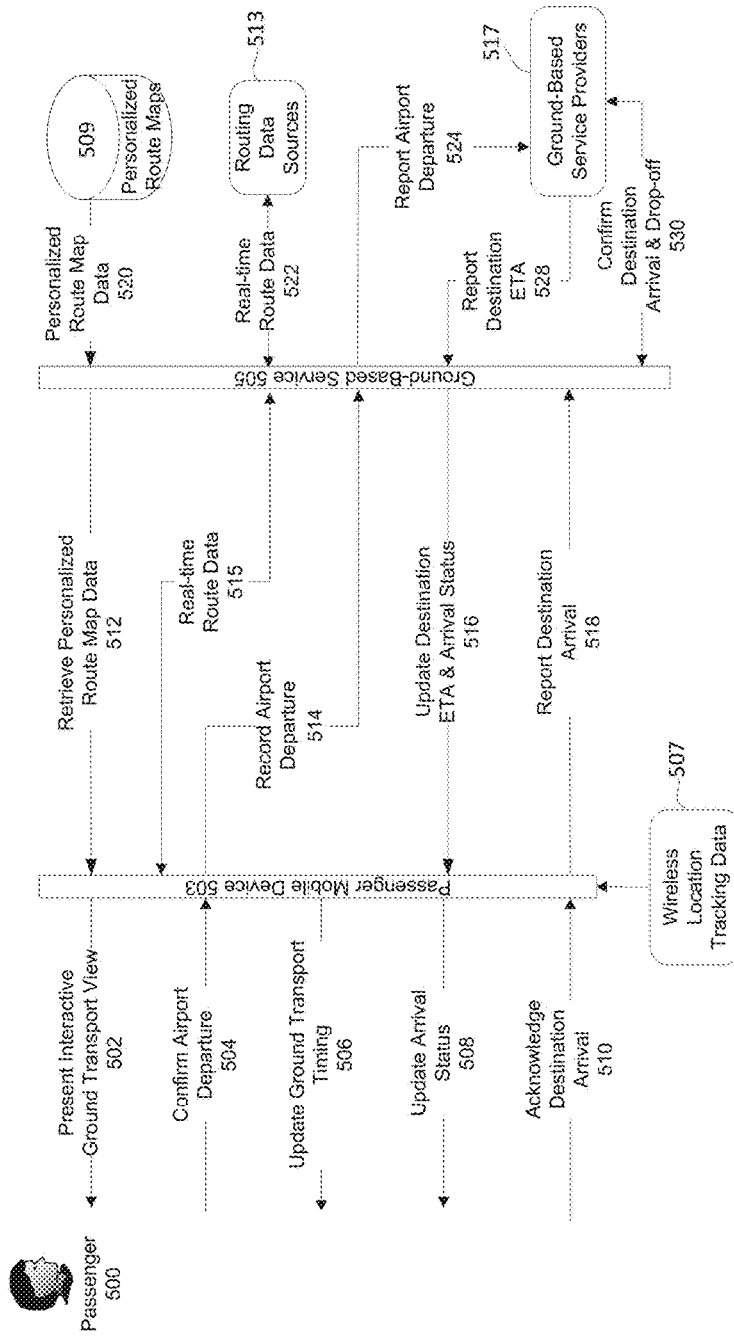
FIG. 5 is a functional diagram of the dataflow of a real-time multimodal travel estimation and routing system while in transit aboard ground transportation to a passenger's personalized destination, according to one embodiment of the invention.

FIG. 5 is a functional diagram of the dataflow of a real-time multimodal travel estimation and routing system 580 while in transit aboard ground transportation to a passenger 500's personalized destination, according to one embodiment of the invention. After the passenger 500 is in transit to the personalized destination aboard the selected ground transportation, the passenger mobile device 503 presents an interactive ground transport view 502. To display the interactive ground transport view 502, the passenger mobile device 503 retrieves the personalized route map data 512 for the passenger 500 from the ground-based service 505, which in turn, retrieves the personalized route map data 520 from personalized route maps 509.

In one embodiment, the interactive ground transport view 502 may comprise a map of the region where the personalized destination of the passenger 500 is located, along with an icon or indicator representing the current location of the passenger 500 and the route to the personalized destination of the passenger 500. Again, the current location of the passenger 500 is obtained using wireless location tracking data 507. In one embodiment, wireless location tracking data 507 is provided by GPS. In another embodiment, the wireless location tracking data 507 is provided by cellular or other wireless networks (such as Wi-Fi or Bluetooth) that may be used to triangulate the location of the passenger mobile device 503. The interactive ground transport view 502 may also include an estimated time to arrive at the personalized destination based on real time route data 515 provided by the ground-based service 505, which retrieves the real-time route data 522 from routing data sources 513. Where the passenger 500 has also selected other ground-based services to be delivered to the personalized destination of the passenger 500, the interactive ground transport view 502 may also include an estimated time for the other ground-based services to arrive at the personalized destination.

As previously discussed, real-time routing data sources 513 may comprise real-time traffic data sources, including real-time traffic status feeds from public entities, such as the department of transportation for the region, or real-time private traffic monitoring entities, real-time sources from private hired ground transport providers (such as GPS tracking of vehicles for ride-sharing services, and dispatch/GPS monitoring services for taxis), real-time sources from public transportation services (either using GPS or other triangulation information, and other passengers using the real-time multimodal travel estimation and routing system 580 by passing the wireless location tracking data 507 of the passenger mobile device 503 to the ground-based service 505 as real-time route data 515, which is then routed to the routing data sources 513 as real-time route data 522.

In one embodiment, where the ground transportation is a private hire, the passenger 500 can confirm his or her departure 504 from the airport via the passenger mobile device 503. A record of the departure from the airport 514 is transmitted to the ground-based service 505, which reports the airport departure 524 of the ground transport service 515. In one embodiment, after the ground-based service providers 517 receives the report of the airport departure 524, the ground-based service providers 517 reports an ETA 528 to the personalized destination of the selected the ground-based services to the ground-based service 505.

The updated destination ETA and arrival status 516 is sent to the passenger mobile device 503, which then displays the updated ground transport timing 506 and the updated arrival status 508 of the ground-based services to the passenger 500. In one embodiment, further updates to the ground transport timing 506 and arrival status 508 may be provided periodically, when transport timing 506 or the arrival status 508 changes from what was previously displayed, or may be requested by the passenger 500. Once the ground transportation reaches the personalized destination, the passenger 500 acknowledges the destination arrival 510 on the passenger mobile device 503. The destination arrival 518 is reported to the ground-based service 505, and the ground-based service providers 517. The ground-based service providers 517 also confirms the destination arrival & drop-off 530 of the other ground-based services with the ground-based service 505 as well.

Figure 6:
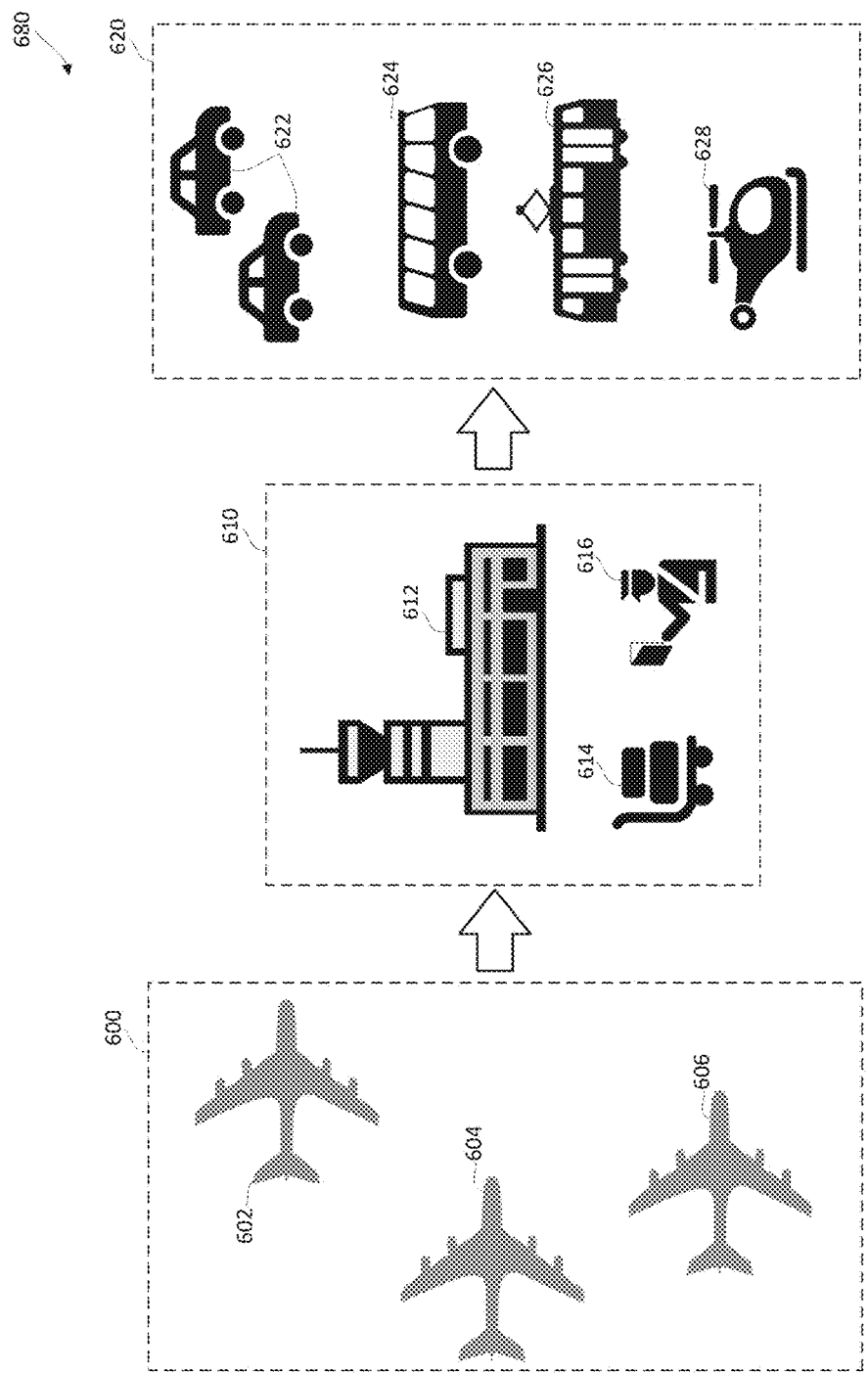
FIG. 6 is a block diagram illustrating ground-transport demand aggregation of a real-time multimodal travel estimation and routing system, according to one embodiment of the invention.

FIG. 6 is a block diagram illustrating ground-transport demand aggregation of a real-time multimodal travel estimation and routing system, according to one embodiment of the invention. As shown in FIG. 6, a plurality of in-bound aircraft 600 may be approaching a destination airport 610 at any given time. While in transit aboard the plurality of in-bound aircraft 600, passengers aboard each respective aircraft 602, 604, and 606 may use the real-time multimodal travel estimation and routing system as previously shown and described in FIGS. 1-5 to aggregate their demand for ride-sharing for various ground transportation options 620. Ground transportation options 620 may include passenger cars 622 (for example, rental cars or private hires), bus 624, train 626, or helicopter 628. Ground transportation options 620 is not limited by travel on the ground (for example, helicopter 628), and may comprise any suitable transportation that is capable of transporting a passenger from the destination airport 610 to their personalized destination, such as boats and ferries, etc.

As previously discussed in connection with FIG. 3, the, the real-time multimodal travel estimation and routing system 680 collects granular ride-sharing demand of the passengers aboard each individual aircraft 602, 604, and 606, and aggregates the ride-share demand based on the desired ground transportation option 620, each passenger's personalized destination, and the estimated time for the passengers to transit through the airport terminal 612, including through the baggage claim 614 (if applicable), and through customs and immigration 616 (if applicable), to reach the pick-up location of the desired ground transportation option 620. Once the real-time multimodal travel estimation and routing system 680 aggregates the ride-share demand of the passengers aboard the plurality of aircraft 620, the real-time multimodal travel estimation and routing system 680 provides the aggregated ride-share demand and pricing to the passengers filtered by the available type of ground transportation options 620, the proximity of the passengers' personalized destinations, and the closeness of the estimated timing of the passengers' arrival at the pick-up location for the desired type of ground transportation option 620. After the passengers on the plurality of aircraft 610 confirm their selection for sharing a desired one of the ground transportation options 620, the real-time multimodal travel estimation and routing system 680 books the desired ground transportation options 620 for the passengers.

For example, aircraft 602 may be 45 minutes away from the airport 610, aircraft 604 may be 25 minutes away from the airport 610, and aircraft 606 may be 55 minutes way from the airport 610. The real-time multimodal travel estimation and routing system 680 crowd sources the ride-share demand for the passengers in each of the aircraft 602, 610, and 604. In this example, a plurality of passengers from each of the aircraft 602, 604, and 606 are interested in sharing passenger cars 622 (for example, a taxi). For simplicity, this example assumes that the personalized destination of each of the passengers are in close geographical proximity. Given the time difference between the arrival times of the aircraft 604 (25 minutes) compared with the aircraft 602 (45 minutes) and the aircraft 606 (55 minutes), the real-time multimodal travel estimation and routing system 680 may aggregate and book passenger cars 622 for those passengers aboard aircraft 604 that do not have to transit through the baggage claim 614 and customs and immigration 616.

The real-time multimodal travel estimation and routing system 680 may further aggregate and book passenger cars 622 for those passengers aboard aircraft 604 that do have to transit through the baggage claim 614 and/or customs and immigration 616 with those passengers aboard aircraft 602 and 606 that do not have to transit through the baggage claim 614 and customs and immigration 616, assuming that the estimated time to transit through the baggage claim 614 and/or customs and immigration 616 is approximately the time difference between the arrival of aircraft 602 compared to aircraft 604 and 606 at the airport 610 such that the passengers will all arrive at the pick-up location for the passenger cars 622 relatively close in time. The real-time travel estimation and routing system 680 repeats the ride-share demand aggregation and booking process for all other flights arriving at the airport 610.

In this manner, the real-time travel estimation and routing system 680 is able to forecast time-phased demand to the providers of the ground transportation options 620, allowing the providers of the ground transportation options 620 to better manage their inventory at the airport 610 at any given point in time and to set pricing accordingly. Because pricing information can be set by the providers of the ground transportation options 620 based on the forecast time-phased demand and the available inventory at the airport 610, the passengers aboard the plurality of aircraft 610 will also be provided accurate pricing, avoiding any surprise surcharges in their desired ground transportation option 620 after their respective aircraft 602, 604, or 606 arrives at the aircraft 610.

Figure 7:
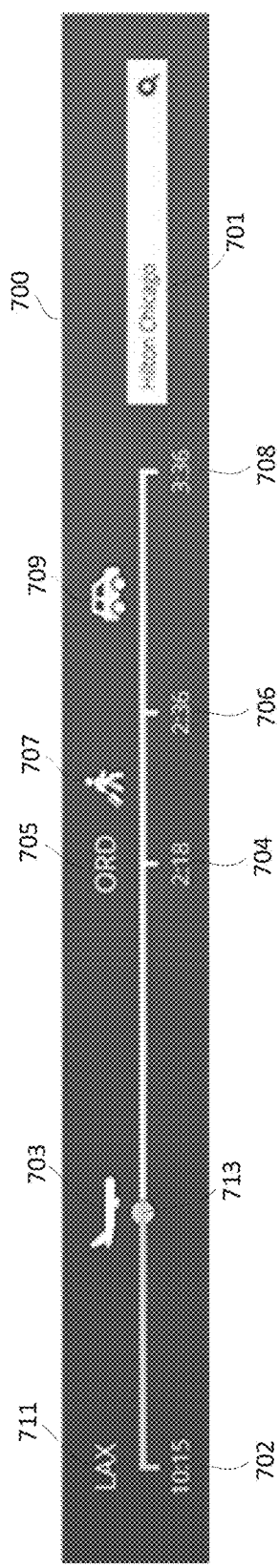
FIG. 7 is a point-to-destination display of an estimated time for a passenger to reach the passenger's personalized destination generated by real-time multimodal travel estimation and routing system, according to one embodiment of the invention.

FIG. 7 is a point-to-destination display 700 of an estimated time for a passenger to reach the passenger's personalized destination generated by real-time multimodal travel estimation and routing system, according to one embodiment of the invention. This display 700 may be generated after the passenger provides a personalized destination 701 (e.g., the Hilton Chicago), and selects and confirms ground transportation 709 (private hire, such as a taxi). As shown in FIG. 7, in one embodiment, the display 700 includes the passenger's departure airport 711 (LAX or Los Angeles International Airport), a departure time 702 (10:15), an indicator 713 representing the current status of the passenger's transit 713 aboard aircraft 703 to the personalized destination 701. The display 700 may further include the destination airport 705 (ORD or Chicago O'Hare International Airport) and an estimated time of arrival 704 (2:18) at the destination airport 705.

As previously discussed, the status of the passenger's transit aboard the aircraft 703 to the destination airport 705 may be obtained from real-time information provided by the aircraft's flight management system, including GPS, airspeed, altitude, and heading direction information. The display 700 further includes a passenger transit icon 707 and an estimated time 706 (2:36) to transit through the destination airport 705 to arrive at the pick-up location of the ground transportation 709. As previously discussed, the estimated time 706 to transit through the destination airport 705 to arrive at the pick-up location of the ground transportation 709 may be aggregated from real-time information sources, for example by tracking the mobile devices of other passengers through the destination airport 705 using cellular and/or other wireless networks, as well as aggregated historical information.

In embodiments where the passenger has checked baggage and/or needs to pass through customs and immigration at the destination airport 705, the display 700 may further include estimates for each of those phases of transit through the destination airport 705, represented by their respective icons and estimated times of transit within the overall estimated time it takes the passenger to transit from the arrival gate to the pick-up location of the ground transport 709. The display 700 further includes an icon representing the ground transport 709, along with an estimated time of arrival 708 (3:36) at the passenger's personalized destination 701 (e.g., the Hilton Chicago). As shown in FIG. 7, the real-time multimodal travel estimation and routing system provides a current position-to-end estimate of the time the passenger will arrive at the passenger's personalized destination 701, including estimated times for all intermediate modes of transit, while still aboard the aircraft 703 in transit to the destination airport 705.

As shown and described in FIGS. 1-7, the real-time multimodal travel estimation and routing system provides a number of benefits over prior art systems. The time estimates and routing information provided by the real-time multimodal travel estimation and routing system are generated from real-time information sources, if available, both in the air and on the ground at every point along the passenger's trip, from when the passenger is aboard the aircraft, when the passenger is transiting through the destination airport to the ground transportation pick-up location or transfer gate, and when the passenger is aboard the ground transportation to the passenger's personalized destination. Real-time information may be further supplemented or used in conjunction with aggregated historical information to provide a better estimate.

Additionally, the real-time multimodal travel estimation and routing system is capable of caching real-time information received from ground sources on an on-board storage of the aircraft, so that even if there is a loss in connectivity between the aircraft and the ground sources, the real-time multimodal travel estimation and routing system can still provide a complete point-to-destination time estimate and routing information to the passenger. Further, the real-time multimodal travel estimation and routing system provides advanced notice to ground-based services so that they can plan ahead to ensure sufficient ground transportation is available for the passenger and others using the real-time multimodal travel estimation and routing system, as well as schedule other ground-based services to arrive at the passenger's personalized destination at the same time the passenger does, and also allows the passenger to make alternative booking arrangements for transfer flights while in the air prior to arriving at the airport. The real-time multimodal travel estimation and routing system also allows passenger and others to crowd source interest in sharing ground transportation to save costs, and forecasts time-phased demand to the ground transportation providers so they can better manage pricing and capacity based on the forecasted demand and available inventory.

While the real-time multimodal travel estimation and routing system is described herein in the context of air travel, the real-time multimodal travel estimation and routing system may be applied to any context requiring multiple modes of transportation for an individual to arrive at a personalized destination, including journeys by boat, train, and so on and so forth. Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A real-time multimodal travel estimation and routing system having a first mode for air-based travel and a second mode for ground-based travel, comprising:
an on-board data store communicatively coupled to a plurality of interactive displays aboard an aircraft, wherein
the plurality of interactive displays are configured to
receive an input designating a ground-based destination,
display one or more available ground-based travel options to the ground-based destination in the second mode,
receive a request for one of the one or more available ground-based travel options, and
display an estimated time of arrival to the ground-based destination based on first data stored on-board the aircraft for the second mode and real-time flight information for the aircraft for the first mode, after a predetermined time, display an updated estimated time of arrival based on the first data for the second mode and the real-time flight information for the aircraft for the first mode, the on-board data store is configured to prior to takeoff of the aircraft, cache the first data corresponding to the one or more available ground-based travel options and travel estimation information for the second mode, during flight of the aircraft, cache second data corresponding to the request for the one of the one or more available ground-based travel options received by the plurality of interactive displays, after takeoff of the aircraft, receive an update of real-time information for at least one of the one or more available ground-based travel options or the travel estimation information in the second mode, and update the first data cached in the on-board data store with the update of real-time information for at least one of the one or more available ground-based travel options or the travel estimation information in the second mode.

2. The real-time multimodal travel estimation and routing system of claim 1, further comprising:

a flight position tracking system communicatively coupled to the on-board data store, wherein the on-board data store is further configured to receive the real-time flight information for the aircraft for the first mode from the flight management system.

3. The real-time multimodal travel estimation and routing system of claim 1, wherein the real-time flight information includes at least one of a global positioning system (GPS) position for the aircraft, a speed of the aircraft, and an altitude of the aircraft.

4. The real-time multimodal travel estimation and routing system of claim 1, wherein the plurality of interactive displays are further configured to display a map having one or more routes to the ground-based destination based on the requested one of the one or more available ground-based travel options superimposed thereon.

5. The real-time multimodal travel estimation and routing system of claim 1, wherein the one or more available ground-based travel options is one of a private hire, a ride-share, or a public transport.

6. The real-time multimodal travel estimation and routing system of claim 1, wherein the travel estimation information comprises road traffic information.

7. The real-time multimodal travel estimation and routing system of claim 1, wherein the travel estimation information comprises transit times through a destination airport.

8. The real-time multimodal travel estimation and routing system of claim 1, wherein the estimated time of arrival is based on a remaining flight time to reach a destination airport, a transit time through the destination airport, and a travel time from the destination airport to the ground-based destination by the requested one or more available ground-based travel options.

9. The real-time multimodal travel estimation and routing system of claim 1, wherein the plurality of interactive displays are further configured to display a remaining flight time to reach a destination airport, a transit time through the destination airport, and a travel time from the destination airport to the ground-based destination by the requested one or more available ground-based travel options.

10. The real-time multimodal travel estimation and routing system of claim 9, wherein the transit time through the destination airport includes a transit time through passport control or customs, and a transit time through baggage claim, as required.

11. The real-time multimodal travel estimation and routing system of claim 1, wherein the plurality of interactive displays are further configured to display one or more available lodging options adjacent the ground-based destination and receive a request for one of the one or more available lodging options.

12. The real-time multimodal travel estimation and routing system of claim 1, wherein the plurality of interactive displays are further configured to display one or more points of interest adjacent the ground-based destination and receive a request for one of the one or more points of interest, and wherein the one or more points of interest includes at least one of a restaurant, a landmark, a tour, and an entertainment venue.

13. A method for estimating a time of arrival to a ground-based destination having a first mode for air-based travel and a second mode for ground-based travel, the method comprising:

caching first data on an on-board data store aboard an aircraft prior to takeoff of the aircraft, the first data corresponding to one or more available ground-based travel options and travel estimation information for the second mode;

receiving an input designating the ground-based destination via an interactive display communicatively coupled to the on-board data store;

displaying, via the interactive display, the one or more available ground-based travel options to the ground-based destination in the second mode;

receiving, via the interactive display, a request for one of the one or more available ground-based travel options;

caching second data on the on-board data store, the second data corresponding to the request for the one or more available ground-based travel options received by the interactive display;

displaying, via the interactive display, an estimated time of arrival to the ground-based destination based on the first data stored on the on-board data store for the second mode and real-time flight information for the aircraft for the first mode;

receiving an update of real-time information for at least one of the one or more available ground-based travel options or the travel estimation information in the second mode during flight of the aircraft, and updating the first data stored on the on-board data store with the update of real-time information;

displaying, via the interactive display, an updated estimated time of arrival based on the updated first data for the second mode and real-time flight information after a predetermined time.

14. The method of claim 13, further comprising:

receiving the real-time flight information for the aircraft for the first mode from a flight position tracking system communicatively coupled to the on-board data store.

15. The method of claim 13, wherein the real-time flight information includes at least one of a global positioning system (GPS) position for the aircraft, a speed of the aircraft, and an altitude of the aircraft.

16. The method of claim 13, further comprising:

displaying, via the interactive display, a map having one or more routes to the ground-based destination based on the requested one of the one or more available ground-based travel options superimposed thereon.

17. The method of claim 13, wherein the one or more available ground-based travel options is one of a private hire, a ride-share, or a public transport.

18. The method of claim 13, wherein the travel estimation information comprises road traffic information.

19. The method of claim 13, wherein the travel estimation information comprises transit times through a destination airport.

20. The method of claim 13, wherein the estimated time of arrival is based on a remaining flight time to reach a destination airport, a transit time through the destination airport, and a travel time from the destination airport to the ground-based destination by the requested one or more available ground-based travel options.

21. The method of claim 13, further comprising:

displaying, via the interactive display, a remaining flight time to reach a destination airport, a transit time through the destination airport, and a travel time from the destination airport to the ground-based destination by the requested one or more available ground-based travel options.

22. The method of claim 21, wherein the transit time through the destination airport includes a transit time through passport control or customs, and a transit time through baggage claim.

23. The method of claim 13, further comprising:

displaying, via the interactive display, one or more available lodging options adjacent the ground-based destination; and receiving, via the interactive display, a request for one of the one or more available lodging options.

24. The method of claim 13, further comprising:

displaying, via the interactive display, one or more points of interest adjacent the ground-based destination; and receiving, via the interactive display, a request for one of the one or more points of interest, wherein the one or more points of interest includes at least one of a restaurant, a landmark, a tour, and an entertainment venue.

* * * * *